United States Patent
Makita

(10) Patent No.: US 10,202,057 B2
(45) Date of Patent: Feb. 12, 2019

(54) SURFACE SKIN-FASTENING STRUCTURE FOR VEHICLE SEAT, OPERATION LEVER DEVICE FOR VEHICLE SEAT, AND VEHICLE SEAT

(71) Applicant: TACHI-S CO., LTD., Akishima-shi, Tokyo (JP)

(72) Inventor: Naoyuki Makita, Akishima (JP)

(73) Assignee: TACHI-S CO., LTD., Akishima-Shi, Tokyo (JP)

( * ) Notice: Subject to any disclaimer, the term of this patent is extended or adjusted under 35 U.S.C. 154(b) by 0 days.

(21) Appl. No.: 15/550,636

(22) PCT Filed: Jan. 12, 2016

(86) PCT No.: PCT/JP2016/050593
§ 371 (c)(1),
(2) Date: Aug. 11, 2017

(87) PCT Pub. No.: WO2016/136299
PCT Pub. Date: Sep. 1, 2016

(65) Prior Publication Data
US 2018/0037144 A1  Feb. 8, 2018

(30) Foreign Application Priority Data
Feb. 23, 2015  (JP) ................. 2015-032574

(51) Int. Cl.
*A47C 7/24* (2006.01)
*A47C 31/02* (2006.01)
(Continued)

(52) U.S. Cl.
CPC ............ *B60N 2/5825* (2013.01); *A47C 31/02* (2013.01); *B60N 2/5841* (2013.01);
(Continued)

(58) Field of Classification Search
CPC ...... B60N 2/5825; B60N 2/5883; B60N 2/68; A47C 31/02
(Continued)

(56) References Cited

FOREIGN PATENT DOCUMENTS

| JP | H 10-181524 A | 7/1998 |
|----|---------------|--------|
| JP | H 11-034713 A | 2/1999 |

(Continued)

OTHER PUBLICATIONS

International Search Report (ISR) (PCT Form PCT/ISA/210), in PCT/JP2016/050593, dated Apr. 19, 2016.

*Primary Examiner* — Rodney B White
(74) *Attorney, Agent, or Firm* — McGinn I.P. Law Group, PLLC

(57) ABSTRACT

A surface skin-fastening structure for a vehicle seat for fastening a surface skin to a framework of a vehicle seat, includes a base member which is integral with the framework, a surface skin-pressing member fitted into the base member, an interlocking member provided to an end of the surface skin, and slits provided to the base member. The base member has an extension section, which is an end edge that makes contact with a reverse surface of the surface skin. The slits extend in linear fashion along the end edge of the base member. With the surface skin covering the end edge of the base member, the interlocking member and the end of the surface skin are inserted into one opening of the slits and pass through the slits to appear from the other opening, and are stopped in a state of surface contact at the base member.

9 Claims, 12 Drawing Sheets

(51) Int. Cl.
*B60N 2/58* (2006.01)
*B60N 2/68* (2006.01)
*B60N 2/60* (2006.01)

(52) U.S. Cl.
CPC ......... *B60N 2/5883* (2013.01); *B60N 2/6009* (2013.01); *B60N 2/68* (2013.01)

(58) Field of Classification Search
USPC .............................. 297/218.1, 218.3, 218.5
See application file for complete search history.

(56) References Cited

FOREIGN PATENT DOCUMENTS

| | | |
|---|---|---|
| JP | 2001-300161 A | 10/2001 |
| JP | 2007-055505 A | 3/2007 |
| JP | 2009-214702 A | 9/2009 |
| JP | 2011-068200 A | 4/2011 |
| JP | 2011-121539 A | 6/2011 |
| JP | 2013-102855 A | 5/2013 |

F I G . 6A
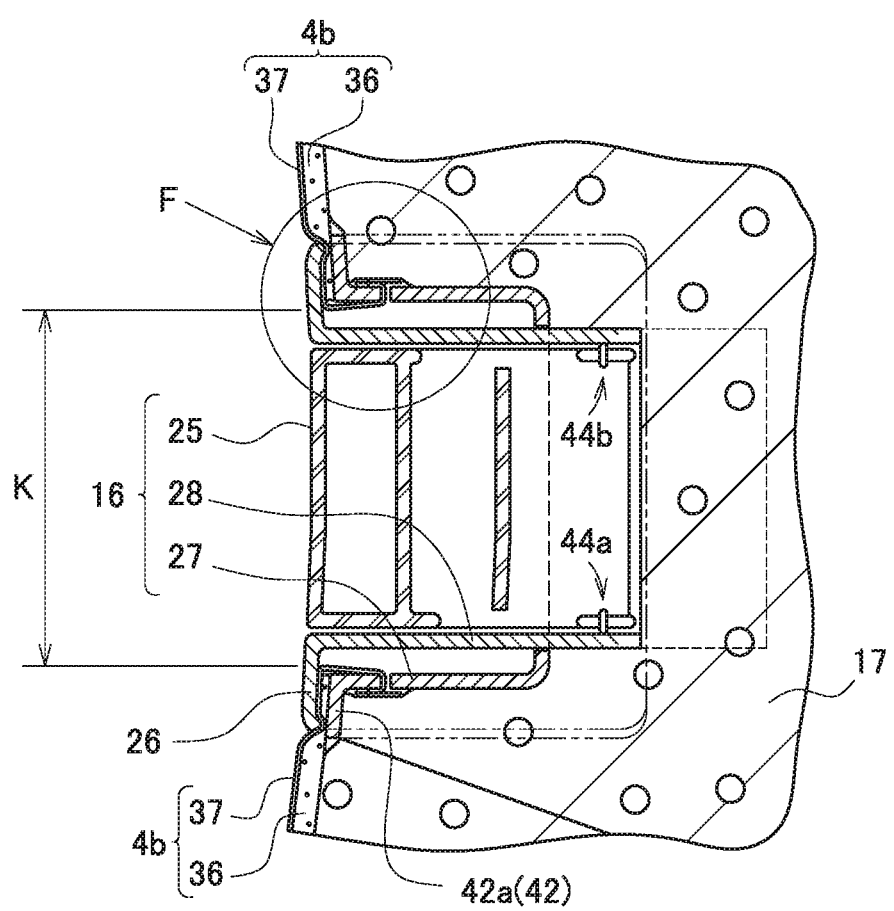

SURFACE SKIN-FASTENING STRUCTURE FOR VEHICLE SEAT, OPERATION LEVER DEVICE FOR VEHICLE SEAT, AND VEHICLE SEAT

TECHNICAL FIELD

The present invention relates to a surface skin-fastening structure for directly or indirectly fastening a surface skin used in a vehicle seat to a framework of the vehicle seat. The present invention also relates to an operation lever device used in the vehicle seat. The present invention furthermore relates to a vehicle seat that uses the surface skin-fastening structure.

BACKGROUND ART (Patent Literature 1) (JP-A 2001-300161)

A conventionally known example of a surface skin-fastening structure is disclosed in Patent Literature 1. In this surface skin-fastening structure, a support piece 102, which is a protrusion, is formed at the distal end of a frame 101, which is a subject for fixing, as shown in FIG. 8A of the present application. A pad 103 is provided around the frame 101. The pad 103 is covered by a surface skin 104. An interlocking plate 105, which is an interlocking member, is joined by sewing N to the end of the surface skin 104. The end of the surface skin 104 to which the interlocking plate 105 is joined is hooked to the support piece 102. A cup holder 106 is attached to the frame 101 by a screw 107. The surface skin 104 hooked to the support piece 102 is pressed by a peripheral edge section of the cup holder 106 attached to the frame 101 so as not to be externally displaced.

In this conventional surface skin-fastening structure, the surface skin 104 is fastened by being pressed by the cup holder 106, which is a pressing component, and there is therefore a problem in that the surface skin 104 readily displaces from the frame 101, which is the subject for fixing, until the cup holder 106 is added to the assembly.

(Patent Literature 2) (JP-A 2009-214702)

Another conventionally known example of a surface skin-fastening structure is disclosed in Patent Literature 2. In this surface skin-fastening structure, an engagement boss 109, which is a protrusion, is provided to a surface skin-material-stretching section 108, which is the subject for fixing, as shown in FIG. 8B. The end section of the surface skin 104 is hooked to the engagement boss 109. A portion 110 of a pull-handle provided to the vehicle door is assembled to the engagement boss 109. The pull-handle 110 assembled to the engagement boss 109 presses the end section of the surface skin 104, whereby the surface skin 104 is fastened so that it cannot displace from the surface skin-material-stretching section 108, which is the subject for fixing.

In this conventional surface skin-fastening structure, the surface skin 104 is fastened by being pressed by the pull-handle 110, which is a pressing component, and there is therefore a problem in that the surface skin 104 readily displaces from the surface skin-material-stretching section 108, which is the subject for fixing, until the pull-handle 110 is added to the assembly.

(Patent Literature 3) (JP-A 11-034713)

Yet another conventionally known example of a surface skin-fastening structure is disclosed in Patent Literature 3. In this surface skin-fastening structure, a core material 111, which is a subject for fixing, is covered by a surface skin 104 to thereby form an armrest pad 112 mounted on a vehicle door, as shown in FIG. 9 of the present application.

The armrest pad 112 is attached to an expansion shelf section 113 mounted on an interior board of the vehicle door. An interlocking piece section 114 and tension engagement pieces 115 are provided to the surface of the expansion shelf section 113. The tension engagement pieces 115 are provided one each to the near side of the interlocking piece section 114 and to the far side of the interlocking piece section 114. These tension engagement pieces 115 sandwich the interlocking piece section 114.

An engagement hole 116 is provided to the end section of the surface skin 104. Meanwhile, a clamp piece 117 and an engagement projection 118 are provided to the core material 111. The engagement projection 118 has a base section 118b, a thin section 118a, a sloped-surface section 118c, and a clasp piece section 118d. The engagement projection 118 is inserted into the engagement hole 116 of the surface skin 104.

When the armrest pad 112 is attached to the interior board of the vehicle door, the engagement projection 118 is pressed and widened by the tension engagement pieces 115, and the clasp piece section 118d of the engagement projection 118 is hooked onto the door-side interlocking piece section 114. The each of the base section 118b, the thin section 118a, the sloped-surface section 118c, and the clasp piece section 118d provided to the engagement projection 118 prevents the surface skin 104 from displacing from the core material 111, which is the subject for fixing member.

The structure of the surface skin-fastening structure disclosed in Patent Literature 3 is complex, costly, requires a large installation space, and has other problems.

(Patent Literature 4) (JP-A 2013-102855)

Next, yet another conventionally known example of a surface skin-fastening structure is disclosed in Patent Literature 4. In this surface skin-fastening structure, the surface skin 104 is fastened to a backboard 119, which is a subject for fixing, as shown in FIG. 10 of the present application. The backboard 119 is a vehicle component attached to the back surface of a seatback constituting a vehicle seat. A carpet 125 is mounted on the surface of the backboard 119.

A fastening device 120 is attached by sewing N to the end section of the surface skin 104. A groove 121 is provided to the backboard 119. The backboard 119 has a support pawl 122, which is a projection that protrudes inside the groove 121. A rotation prevention wall 123 is provided to the peripheral edge section of the backboard 119.

The distal end of the fastening device 120 attached to the end of the surface skin 104 is inserted into the groove 121 of the backboard 119 when the surface skin 104 is mounted on the backboard 119. An interlocking section 124 of the distal end of the inserted fastening device 120 is hooked and held to the bottom surface of the support pawl 122. The distal end on the left side of the top section of the fastening device 120 makes contact with the rotation prevention wall 123, whereby the rotation of the fastening device 120 is prevented.

In the conventional surface skin-fastening structure disclosed in Patent Literature 4, the fastening device 120 attached to the end section of the surface skin 104 engages the support pawl 122 and the rotation prevention wall 123 inside the groove 121 of the backboard 119, which is the subject for fixing, whereby the surface skin 104 is prevented from displacing from the backboard 119.

In this conventional surface skin-fastening structure, there is a problem in that the fastening device 120 attached to the end section of the surface skin 104 must be given a complex shape, the interior of the groove 121 of the backboard 119, which is the subject for fixing, must also be provided a complex shape in order to fasten the fastening device 120, and component costs are very high.

CITATION LIST

Patent Literature

Patent Literature 1: JP-A 2001-300161
Patent Literature 2: JP-A 2009-214702
Patent Literature 3: JP-A 11-034713
Patent Literature 4: JP-A 2013-102855

SUMMARY OF INVENTION

Technical Problem

The present invention was devised in view of the problems described above in prior-art devices, and an object thereof is to provide a surface skin-fastening structure in which structure is simple, work for fastening the surface skin can be carried out in a simple manner, and costs can be reduced.

Solution to Problem

A surface skin-fastening structure for a vehicle seat for fastening a surface skin (4b) to the framework (9) of a vehicle seat (1), comprising: a base member (27), which is integral with the framework (9); a surface skin-pressing member (28) fitted into the base member (27); an interlocking member (39) provided to an end (38) of the surface skin (4b); and slits (43) provided to the base member (27), wherein: the base member (27) has an end edge (42) that makes contact with a reverse surface of the surface skin (4b); the slits (43) extend in linear fashion along the end edge (42) of the base member (27); with the end edge (42) of the base member (27) being covered with the surface skin (4b), the interlocking member (39) and the portion of the end (38) of the surface skin (4b) to which the interlocking member (39) is provided, are inserted into one opening of the slits (43) and pass through the slits (43) to appear from the other opening, and are stopped in a state of surface contact at the base member (27) in the vicinity of the other opening; and the surface skin-pressing member (28) presses the surface skin (4b) against the end edge (42) of the base member (27).

The base member being "integral" with the framework means that, e.g., the base member, which is a separate member from the framework, is fastened to the framework by screw fastening or bonding, or the base member is integrally formed together with the framework by a synthetic resin.

In accordance with the present invention, the surface skin is fastened to the base member by the interlocking member being inserted into the slits, and then the surface skin is furthermore pressed to the base member by the surface skin-pressing member. Therefore, the surface skin can be securely fastened to the base member, and consequently the framework.

The surface skin is fastened in advance to the base member by the interlocking member being inserted into the slits, and therefore the work for pressing the surface skin to the base member with the aid of the surface skin-pressing member is greatly facilitated. As a result, the work of fastening the surface skin is facilitated.

The surface skin-fastening structure of the present invention is formed in a simple manner by the interlocking member, the slits, and the surface skin-pressing member, and costs are therefore very low.

In an aspect of the surface skin-fastening structure for a vehicle seat according to the present invention, the interlocking member is joined to the end of the surface skin by sewing, and the sewing position is a position nearer to the end edge of the surface skin than to the center of the interlocking member.

In accordance with this aspect, the process in that the distal end section of the surface skin to which the interlocking member is joined is inserted into the slits, and then the interlocking member is made into surface contact with the reverse surface of the base member, can be readily carried out.

In another aspect of the surface skin-fastening structure for a vehicle seat according to the present invention, the end edge of the base member is an extension section that extends outward, and the surface skin-pressing member presses the surface skin to the extension section.

In accordance with this aspect, the distal end of the surface skin is inserted in to the slits, whereby the work for fastening the surface skin to the base member can be readily and stably carried out.

In yet another aspect of the surface skin-fastening structure for a vehicle seat according to the present invention, the slits are provided to both sides of the base member so as to sandwich the surface skin-pressing member, the extension section has first extension sections that correspond to each of the slits and second extension sections continuous with the first extension sections, the first extension sections extend in a direction crosswise to the direction in which the surface skin-pressing member is fitted into the base member, the second extension section extends in the direction substantially parallel to the direction in which the surface skin-pressing member is fitted into the base member, and the surface skin-pressing member presses the surface skin to each of the first extension sections and the second extension section.

In accordance with this aspect, the surface skin can be securely fastened by the base member and the surface skin-pressing member.

In yet another aspect of the surface skin-fastening structure for a vehicle seat according to the present invention, the base member is the framework itself or a member fastened to the framework.

If the base member is the framework itself, the number of components can be reduced. On the other hand, if the base member as a separate component from the framework is secured to and integrated with the framework, machining of holes and the like in the framework is not required and the strength of the framework is not reduced.

In yet another aspect of the surface skin-fastening structure for a vehicle seat according to the present invention, the base member is a separate member from the framework of the vehicle seat and is a member fastened to the framework, and the framework is formed in a shell shape using carbon fiber reinforced plastic (CFRP). A shell shape is a shape formed by a single plate-like member and is a three-dimensional shape formed so as to conform to the contour of a subject (e.g., the contour of a human back) such as the human body.

CFRP is a material made to have high strength by the inclusion of fibers. However, when the slits are formed in a CFRP structure, the fibers inside the CFRP are severed at the slit portions, whereby strength of the CFRP structure is reduced. In contrast, in accordance with the present aspect, the slits are not formed in the framework itself, and the strength of the CFRP can therefore be maintained.

Next, the operation lever device for a vehicle seat according to the present invention comprising: an operation lever provided to an opening opened in a surface skin; a frame member provided to the periphery of the operation lever on the outer side of the surface skin; and a surface skin-fastening structure for fastening the surface skin to the framework of the vehicle seat, wherein: the surface skin-fastening structure is the surface skin-fastening structure for a vehicle seat according to the above-described aspects; and the frame member is a portion of the surface skin-pressing member and the frame member presses the surface skin to the end edge of the base member.

In accordance with this operation lever device, the same effects as the surface skin-fastening structure according to the present invention can be obtained.

Next, the vehicle seat according to the present invention has a seat cushion on which the buttocks of a seated occupant rests, and a seatback for accommodating the back of the seated occupant, wherein: the seatback has a seatback framework, a pad mounted on the seatback framework, a surface skin covering the pad, and a surface skin-fastening structure for fastening the surface skin to the seatback framework; and the surface skin-fastening structure is the surface skin-fastening structure for a vehicle seat according to the above-described aspects. In accordance with this vehicle seat, the same effects as the surface skin-fastening structure according to the present invention can be obtained.

In an aspect of the vehicle seat according to the present invention, the seatback framework is formed in a shell shape using synthetic resin.

Advantageous Effects of Invention

According to the surface skin-fastening structure, operation lever device, and vehicle seat of the present invention, the interlocking member is inserted into the slits, whereby the surface skin is fastened to the base member, and then the surface skin is furthermore pressed to the base member by the surface skin-pressing member. Therefore, the surface skin can be securely fastened to the base member, and consequently to the framework.

The surface skin is fastened in advance to the base member by the interlocking member being inserted into the slits, and therefore the work for pressing the surface skin to the base member with the aid of the surface skin-pressing member is greatly facilitated. As a result, the work of fastening the surface skin is facilitated.

The surface skin-fastening structure of the present invention is formed in a simple manner by the interlocking member, the slits, and the surface skin-pressing member, and costs are therefore very low.

BRIEF DESCRIPTION OF DRAWINGS

FIG. 6A is a cross-sectional view of the operation lever section along the line E-E of FIG. 5;

DESCRIPTION OF EMBODIMENTS

Figure 1:
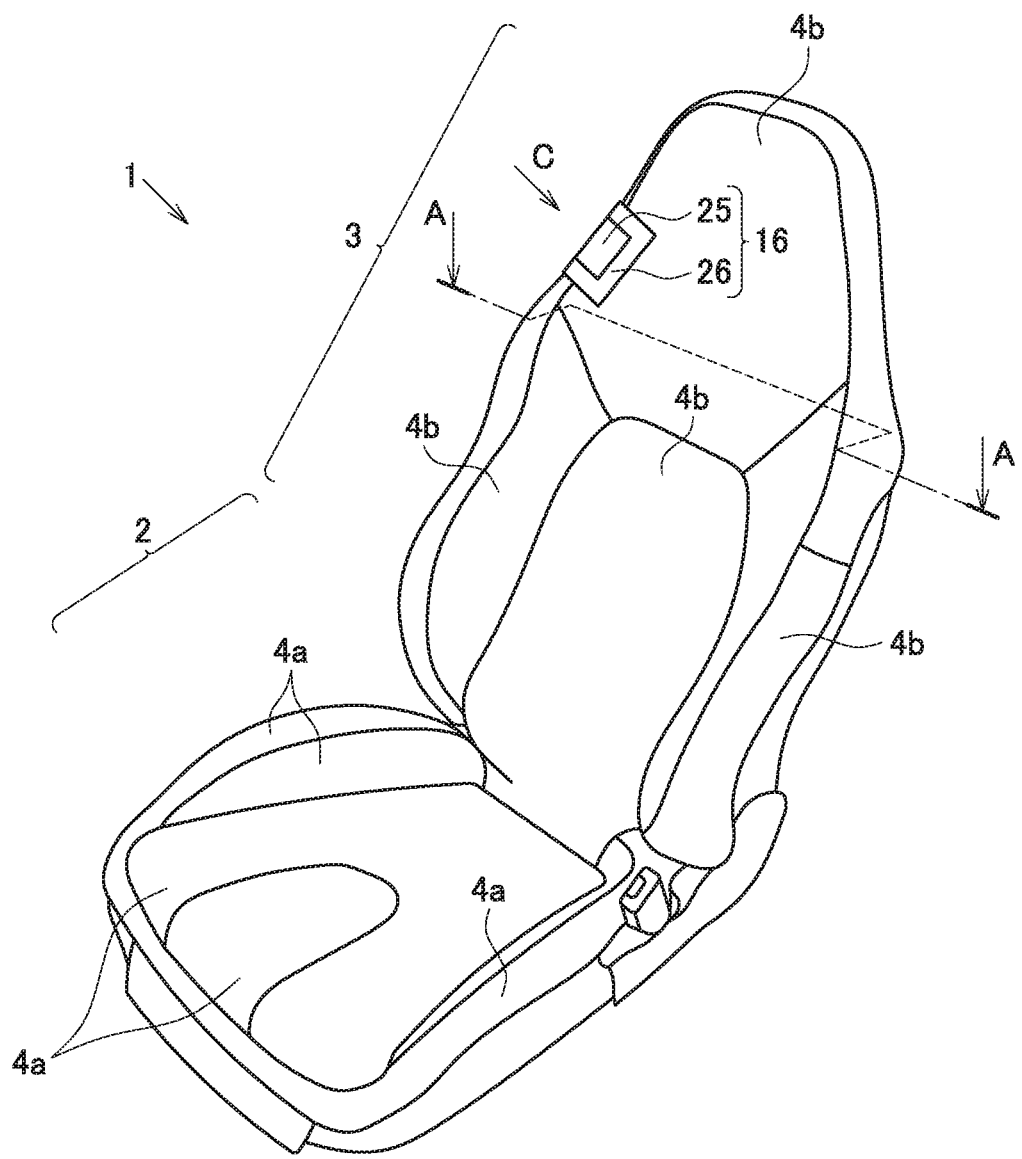
FIG. 1 is a perspective view showing an embodiment of the vehicle seat and operation lever device according to the present invention.

The surface skin-fastening structure for a vehicle seat, the operation lever device for a vehicle seat, and the vehicle seat according to the present invention will be described using an embodiment. The present invention is naturally not limited by this embodiment. Also, the constituent elements may be shown in different proportions than the actual object in order to facilitate understanding of the characteristic portions in the drawings attached to the present specification.

(Vehicle Seat)

FIG. 1 shows an embodiment of the vehicle seat according to the present invention. The vehicle seat 1 has a seat cushion 2 on which the buttocks of a seated occupant rests, and a seatback 3 for accommodating the back of the seated occupant. The surface of the seat cushion 2 is covered by a surface skin 4a. The surface of the seatback 3 is covered by a surface skin 4b.

(Framework Structure)

Figure 2:
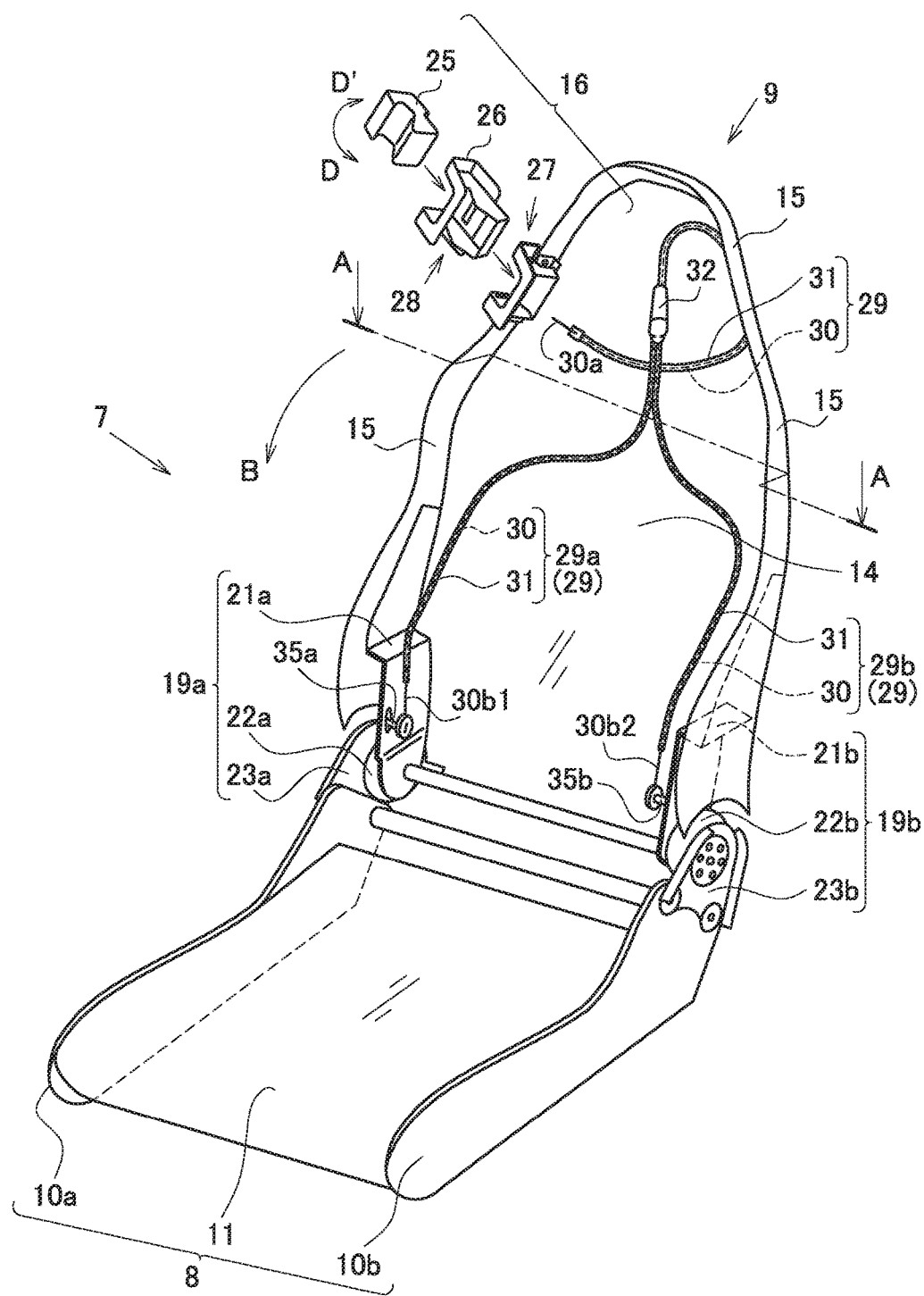
FIG. 2 is a perspective view showing an embodiment of the framework structure used in the vehicle seat of FIG. 1.

FIG. 2 shows a framework structure provided to the interior of the vehicle seat 1 of FIG. 1. This framework structure 7 has a lower section seat cushion framework 8 and an upper section seatback framework 9. The seat cushion framework 8 is a framework structure for the seat cushion 2 of FIG. 1. The upper seatback framework 9 of FIG. 2 is the framework structure for the seatback 3 of FIG. 1.

The seat cushion framework 8 has a side framework member 10a positioned on the right side from the perspective of the seated occupant, a side framework member 10b positioned on the left side from the perspective of the seated occupant, and a center framework member 11 provided between the side framework members 10a, 10b. In addition to the side framework members 10a, 10b and the center framework member 11, various functional components are included as required in the seat cushion framework 8, but these functional components are not shown in FIG. 2. The side framework members 10a, 10b and center framework member 11 are formed using a steel material, or a hard synthetic resin.

Figure 3:
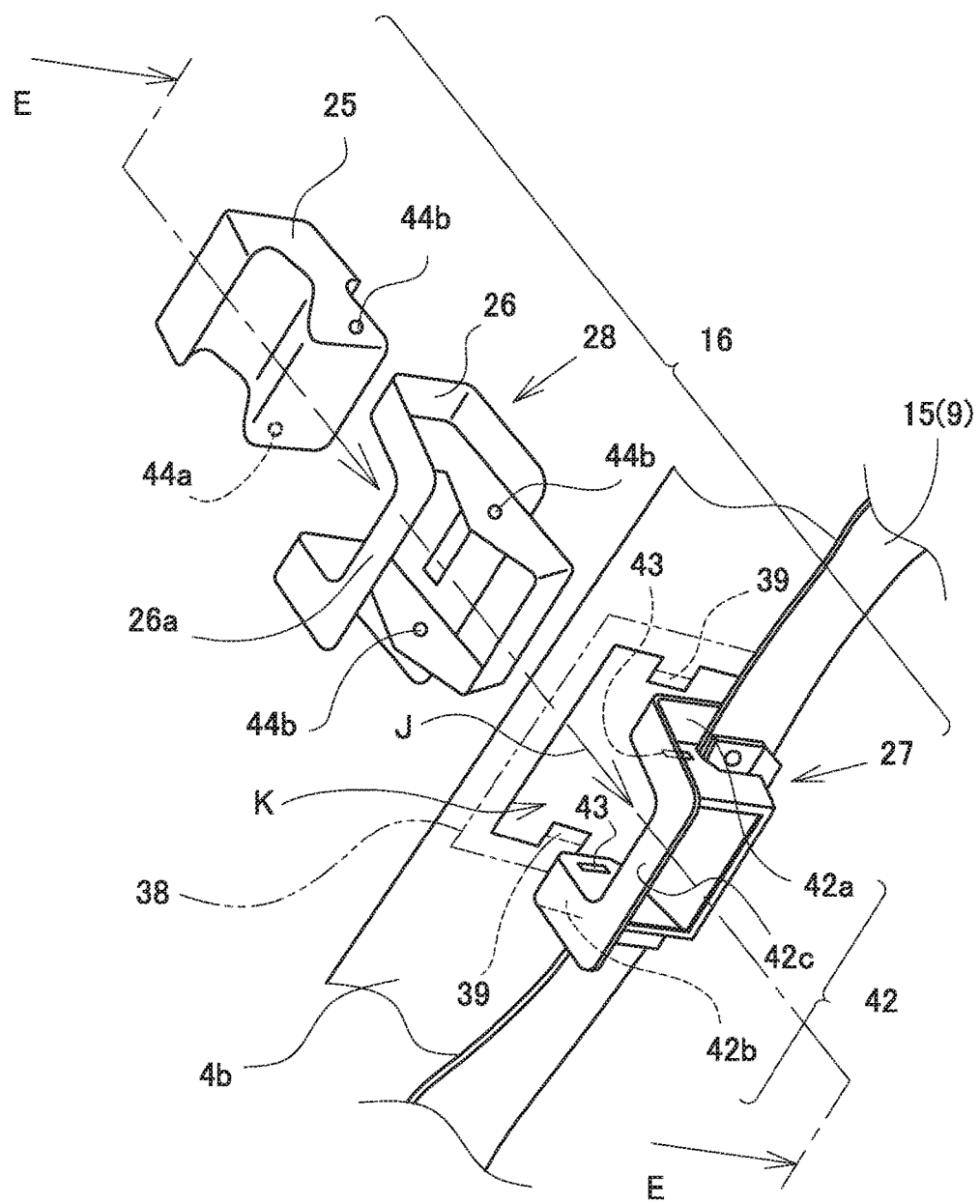
FIG. 3 is a perspective view showing an enlarged view of the operation lever device, which is the principal part of FIG. 2.

The seatback framework 9 has a main body section 14, which is a portion that corresponds to the back of the seated occupant and the head of the seated occupant, and a peripheral wall section 15, which is an erect section provided to the peripheral edge section of the main body section 14. The main body section 14 is a single flat plate-shaped member with uniform thickness having no curvature, or is a single plate-shaped member with uniform thickness and having slight curvature to follow the back of a person. The peripheral wall section 15 is provided to the entire area of the peripheral edge of the main body section 14, excluding the portion where an operation lever section 16 is attached. The peripheral wall section 15 has increased height in the lower section near the seat cushion framework 8 and reduced height in the upper section a distance away from the seat cushion framework 8. As shown in FIG. 3, the operation lever section 16 has a base member 27, a surface skin-pressing member 28, and an operation lever 25. The surface skin-pressing member 28 has a frame member 26, which is an extension section that extends outward.

In the light of the above configuration, the seatback framework 9 of the present embodiment is not a frame-like framework, but is rather a panel-shaped seatback framework in which the portion corresponding to the back of a seated occupant is a plate-like member. The panel-shaped seatback framework is sometimes referred to as a shell-shaped seatback framework. The shell shape is a shape formed by a single plate-like member and is a three-dimensional shape formed so as to conform to the contour of a subject such as the human body; the contour being for example a contour of a human back.

The shell-shaped seatback framework 9 having the main body section 14 and the peripheral wall section 15 is formed by a resin molding using carbon fiber reinforced plastic (CFRP), which is a fiber-containing synthetic resin. The entire shell-shaped structure is formed by a single plate-like member and tends to have low strength, but forming this with CFRP can increase strength. Furthermore, the shell-shaped structure can be formed with low thickness.

CFRP includes: a configuration in which the carbon fibers are lined up in a single direction; a configuration in which a plurality of layers containing carbon fibers that extend in different directions is stacked so that, as a result, the carbon fibers extend with random variability; a configuration in which the carbon fibers extend in random directions in a continuously connected state; and other configurations. However, CFRP having any configuration can be used in the present embodiment.

As noted above, in the present embodiment, the seatback framework 9 of FIG. 2 is formed by resin molding using CFRP, and therefore, the seatback framework 9 is formed into a shell shape, which is a thin plate shape with a high peripheral wall section and which is a lightweight, high strength shape. Such a seatback framework with a shell shape can be advantageously used as a bucket seat (i.e., a seat with increased fastening function for the seated occupant by increasing the height of the left and right rim sections to deeply enclose the buttocks and shoulders of the seated occupant).

Figure 4:
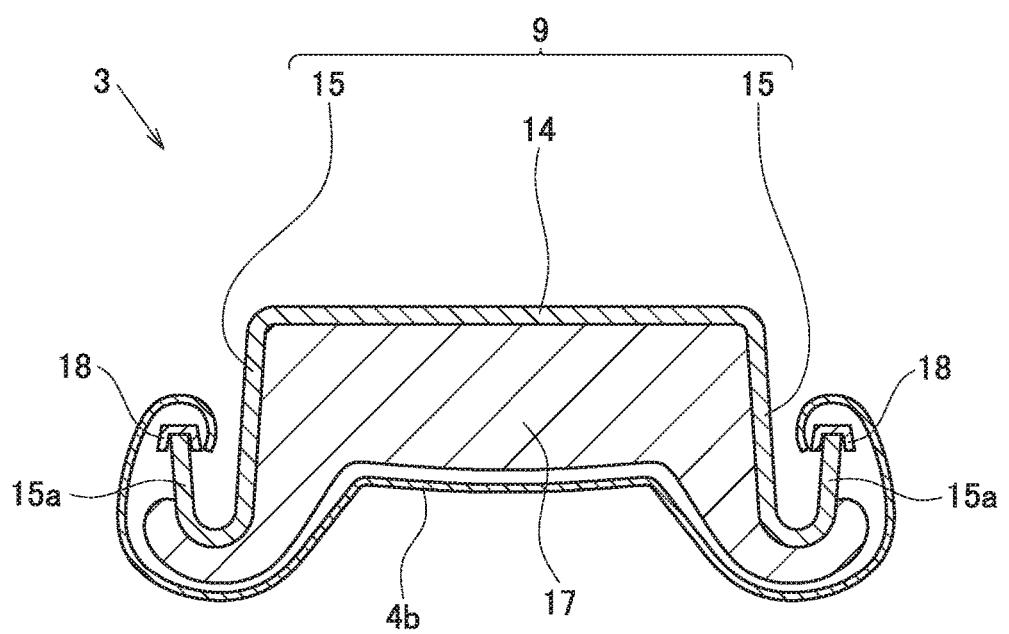
FIG. 4 is a plan cross-sectional view of the seatback along the line A-A of FIG. 1.

FIG. 4 shows the cross-sectional structure of the flat cross-sectional part of the seatback 3 along the line A-A of FIG. 1. As shown in the drawing, the seatback 3 is formed by mounting a pad 17, which is an elastic member, on the front side (i.e., the side facing the seated occupant, the lower side of FIG. 4) of the seatback framework 9, and furthermore covering the surface of the pad 17 with the surface skin 4b (see FIG. 1). The pad 17 is formed by, e.g., a urethane foam material, which is an elastic member. The surface skin 4b is formed using e.g., a fabric such as a woven, knitting, or the like, or leather, artificial leather, or the like.

A bend-around section 15a is provided to the distal end of the peripheral wall section 15 of the seatback framework 9. A hook member 18 is affixed by, e.g., sewing or bonding to the end section of the surface skin 4b. The hook member 18 is formed using a hard material such as synthetic resin, metal, or the like. The hook member 18 is hooked to the distal end of the bend-around section 15a of the peripheral wall section 15 of the seatback framework 9 and is attached to the seatback framework 9 so that the surface skin 4b covers the pad 17.

The seat cushion 2 of FIG. 1 also has a pad mounted to the periphery of the seat cushion framework 8 of FIG. 2 in similar fashion to the seatback 3, and is formed by the pad being covered by the surface skin 4a of FIG. 1.

(Seatback Tilting Movement Structure)

In FIG. 2, brackets 21a, 21b are fastened by, e.g., screws or bonding, or the like to the inner surface of the left and right lower sections of the peripheral wall section 15 of the seatback framework 9. The brackets 21a, 21b are formed with, e.g., metal or a hard synthetic resin. The brackets 21a, 21b are joined, via tilting movement mechanisms 22a, 22b, to the end sections of the back side of the side framework members 10a, 10b of the seat cushion framework 8. In this manner, the seatback framework 9 is linked to the seat cushion framework 8. The bracket 21a and bracket 21b are members that serve the same function, and the shapes thereof are symmetrical.

Described in greater detail, in FIG. 2, one of the side surfaces of the tilting movement mechanisms 22a, 22b is attached to the lower section of the brackets 21a, 21b. Second brackets 23a, 23b are attached to the other side surface of the tilting movement mechanisms 22a, 22b. In other words, the tilting movement mechanisms 22a, 22b are held between the first brackets 21a, 21b and the second brackets 23a, 23b. The second brackets 23a, 23b are joined to the end section on the back side of the side framework members 10a, 10b of the seat cushion framework 8. Thus, the seatback framework 9 is linked to the seat cushion framework 8. In this manner, in the present embodiment, linking means 19a, 19b for linking the seat cushion framework 8 and the seatback framework 9 is composed of the brackets 21a, 21b, the tilting movement mechanisms 22a, 22b, and the second brackets 23a, 23b.

The tilting movement mechanisms 22a, 22b have a function for urging the seatback framework 9 to pivot forward (i.e., tilting movement) in the manner indicated by the arrow B with the aid of a spring (e.g., a spiral spring), which is an elastic member. Also, the tilting movement mechanisms 22a, 22b can assume an unlocked state so that the seatback framework 9 can be tiltably moved in relation to the seat cushion framework 8. The specific structure of the tilting movement mechanisms 22a, 22b can be constructed using, e.g., a structure conventionally known as a reclining mechanism.

When the tilting movement mechanisms 22a, 22b are set in an unlocked state, the seatback framework 9 tiltably moves forward in the manner indicated by the arrow B by the operation of the elastic urging function of the tilting movement mechanisms 22a, 22b. The seatback 3 in FIG. 1 can thereby be tiltably moved toward the direction of the seat cushion 2 (i.e., forward direction). The tilting movement is restricted in range by the tilting movement mechanisms 22a, 22b. Switching the tilting movement mechanisms 22a, 22b into a locked state in this tilting movement range thereby allows the position of the seatback to be secured (i.e., locked) in a position suited to the seated occupant.

In FIG. 1, the operation lever section 16 is provided to the portion of the seatback 3 that corresponds to the upper part of the right shoulder of the seated occupant and to the right part of the head of the seated occupant. In FIG. 2, the operation lever section 16 has the base member 27, the surface skin-pressing member 28, and the operation lever 25. The base member 27 is fastened to the peripheral wall section 15 of the seatback framework 9 and is integrated with the seatback framework 9, as shown in FIG. 3. This fastening can be achieved by a screw, bonding, or other arbitrary means. The base member 27 can also be formed integrally with the seatback framework 9 by resin molding.

The base member 27 is a substantially angled tube-shaped having an internal space. The internal space extends through the base member 27 from the upper left of FIG. 3 toward the lower right direction. The surface skin-pressing member 28 is fitted into the internal space of the base member 27 as indicated by the arrow J. The end edge of the base member 27 is an extension section 42 that extends outward. The extension section 42 has first extension sections 42a, 42b and a second extension section 42c. The first extension sections 42a, 42b extend in the direction crosswise to the direction J in which the surface skin-pressing member 28 fits into the base member 27 (e.g., the direction perpendicular to the direction J). The second extension section 42c extends in the direction substantially parallel to the direction J in which the surface skin-pressing member 28 fits into the base member 27.

One end section of the second extension section 42c is continuous to one first extension section 42a and the other end section is continuous with the other first extension section 42b. In other words, the second extension section 42c is disposed in a state that connects the pair of first extension sections 42a and 42b. The end edge of the base member 27 need not necessarily be formed as an extension section, but the thickness of the angled tube-shaped base member 27 itself may be used as an end edge.

Figure 5:
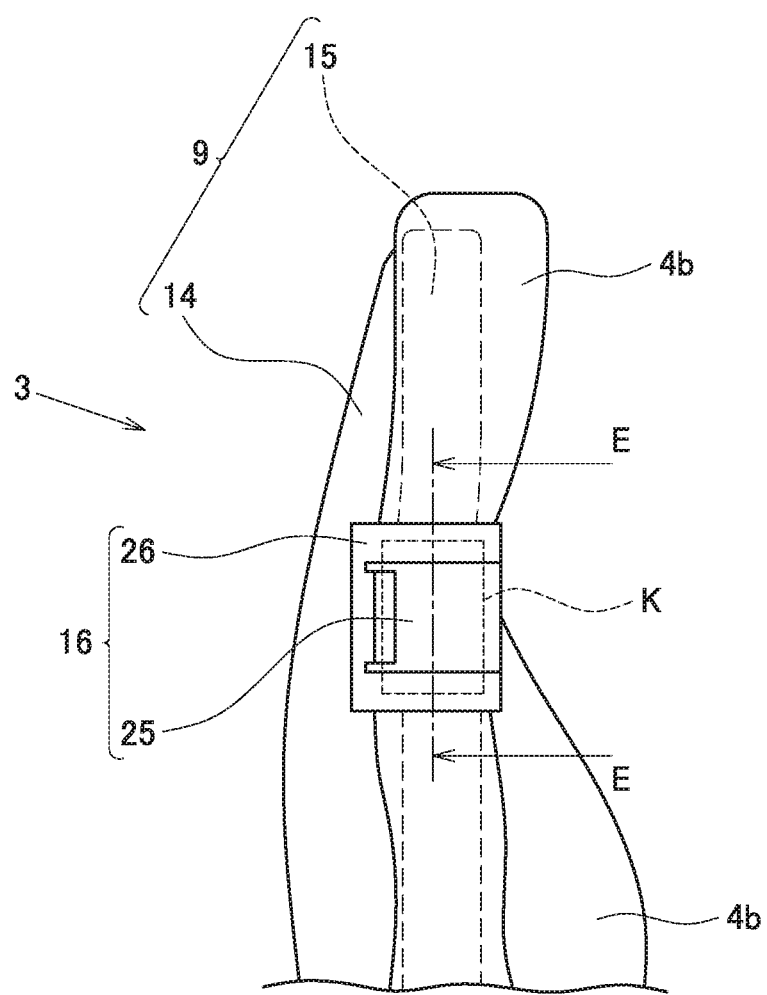
FIG. 5 is a side view of a portion of the seatback in the direction of the arrow C of FIG. 1.

FIG. 5 shows a portion of the side surface of the seatback 3 in the direction of the arrow C of FIG. 1. As shown in FIG. 5, a frame member 26 of the operation lever section 16 is provided so as to surround the top section of the operation lever 25. Thus, the frame member 26 functions as an escutcheon, i.e., a frame member for decorative reinforcement, that is to say, a fringe cover.

In FIG. 2, a wire cable 29 is provided between the operation lever section 16 and the tilting movement mechanisms 22a, 22b. The wire cable 29 is formed by enclosing an inner cable 30, which is a long narrow solid wire, in an outer cable 31, which is a long narrow hollow tube (i.e., a tubular member). The wire cable 29 is branched, in the upper section thereof, into two wire cables 29a and 29b by a divider 32.

An upper end 30a of the inner cable 30 of the wire cable 29 is connected to the operation lever 25 of the operation lever section 16. Lower ends 30b1, 30b2 of the inner cable 30 extending out from the lower end of the bisected wire cables 29a, 29b are linked to pins 35a, 35b extending out from the tilting movement mechanisms 22a, 22b.

A finger hook portion that allows a human finger to hook into is provided to the reverse side of the operation lever 25. When a person hooks a finger into the finger hook portion and rotates the operation lever 25 a suitable angle in the longitudinal front-rear direction as indicated by the arrow D-D', the inner cable 30 of the wire cable 29 retractably moves along the axial direction of the inner cable 30 itself inside the outer cable 31. An elastic member, e.g., a spring that urges the operation lever 25 in the arrow D' direction (rear direction) in advance is provided inside the operation lever section 16. Therefore, the operation lever 25 is set to the arrow D' side in its natural state.

When the operation lever 25 is rotated in the direction of the arrow D (forward direction), the inner cable 30 of the wire cable 29 is pulled upward inside the outer cable 31. When the inner cable 30 is pulled upward, the lower ends 30b1, 30b2 of the inner cable 30 move upward, and the tilting movement mechanisms 22a, 22b are thereby set in an unlocked state.

When the tilting movement mechanisms 22a, 22b are set in an unlocked state, the seatback framework 9 tiltably moves forward as indicated by the arrow B by the operation of the elastic urging function of the tilting movement mechanisms 22a, 22b. The seatback 3 can thereby be tiltably moved in the direction of the seat cushion 2 (i.e., forward) in FIG. 1. The tiltable movement of the seatback 3 allows the posture of the seated occupant to be moved to an optimal position. To lock the seatback 3, the seatback 3 is unlocked and then inclined rearward. When the seatback 3 arrives at a specified position in the rearward direction, the seatback 3 is set in a locked state.

(Surface Skin-fastening Structure)

Figure 6B:
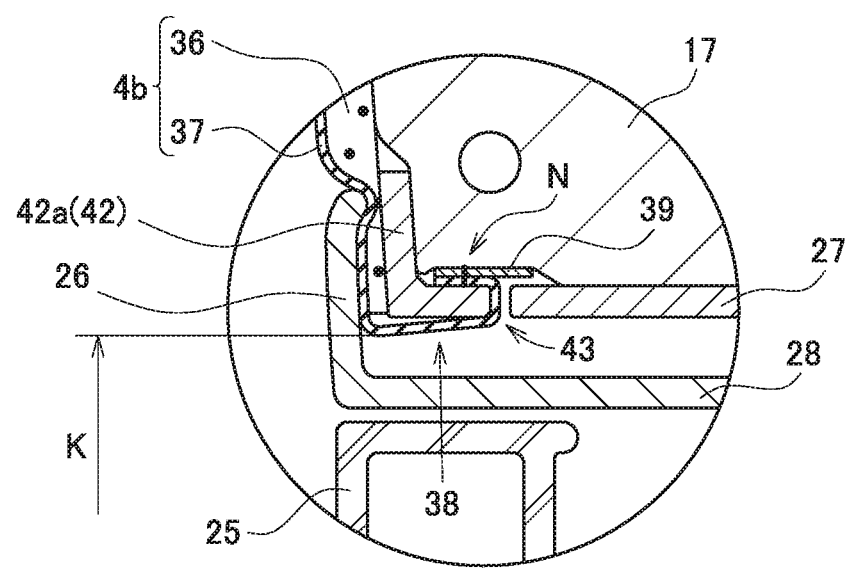
FIG. 6B is an enlarged view of the portion indicated by the arrow F in FIG. 6A.

FIG. 6A shows the cross-sectional structure of the operation lever section 16 along the line E-E of FIG. 5 (i.e., the line E-E of FIG. 3). FIG. 6B is an enlarged view of the portion indicated by the arrow F in FIG. 6A. As shown in FIG. 6A, the surface skin 4b is composed of a first layer 36 and a second layer 37. The first layer 36 is an elastic material and the second layer 37 is a fabric such as a woven, knitting, or the like, or leather, artificial leather, or the like.

The operation lever section 16 is provided inside an opening K opened in the surface skin 4b. The operation lever section 16 is provided inside the pad 17. An end 38 of the surface skin 4b is composed of solely the second layer 37, as shown in FIG. 6B. A plate-like interlocking member 39 is joined by sewing N to the distal end section of the end 38. The interlocking member 39 is formed by a metal, hard synthetic resin, or the like.

Figure 7:
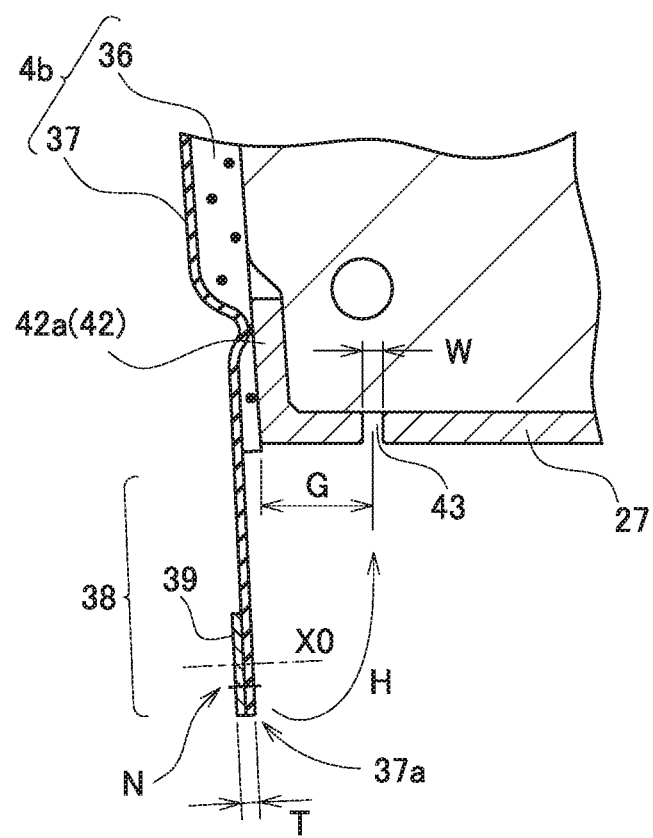
FIG. 7 is a cross-sectional view showing the state in which the surface skin, which is curved in FIG. 6B, is laid out.
Figure 8A:
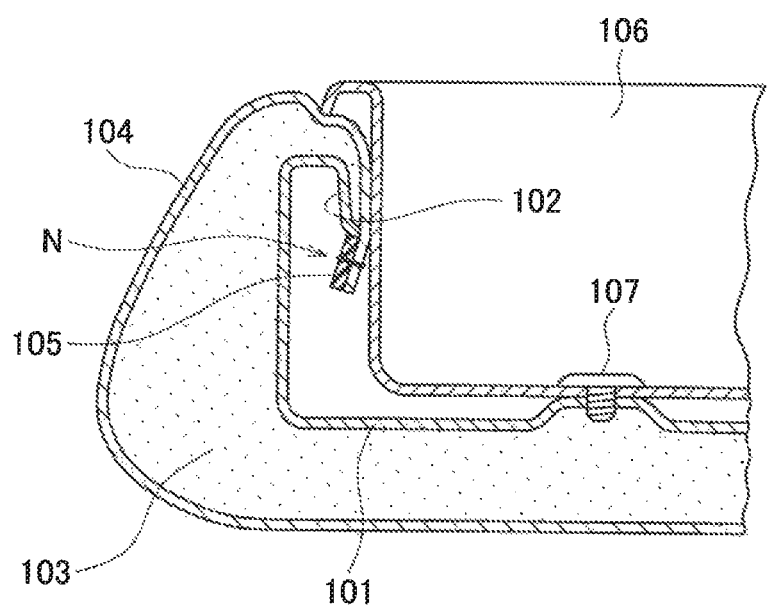
FIG. 8A is a cross-sectional view showing an example of a conventional surface skin-fastening structure.
Figure 8B:
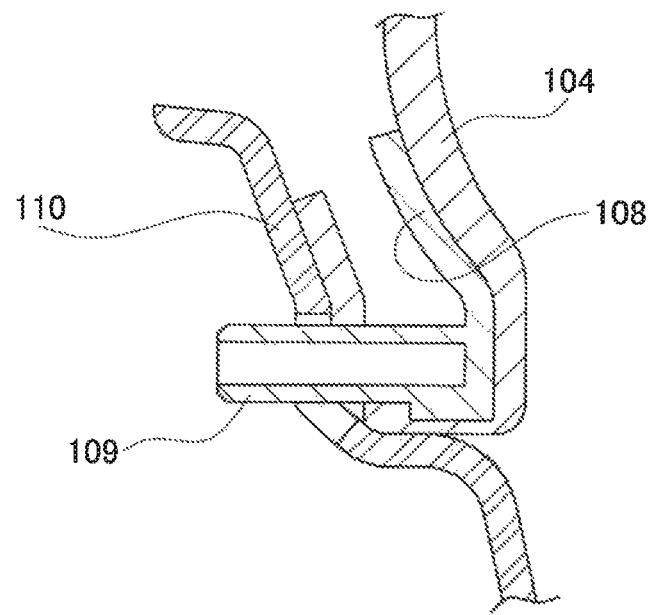
FIG. 8B is a cross-sectional view showing another example of a conventional surface skin-fastening structure.
Figure 9:
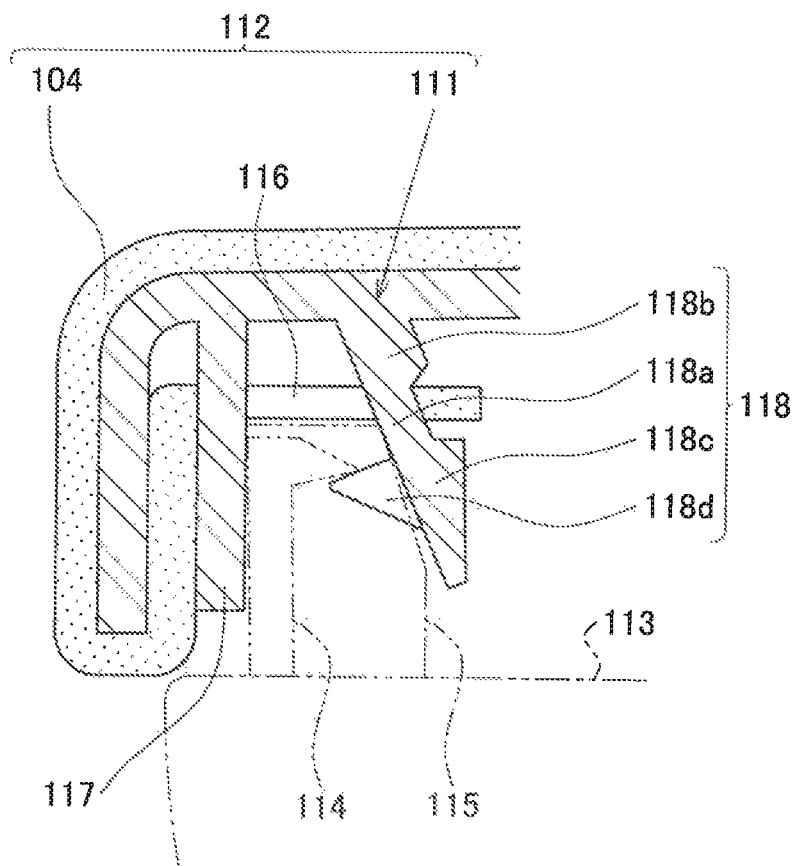
FIG. 9 is a cross-sectional view showing yet another example of a conventional surface skin-fastening structure.
Figure 10:
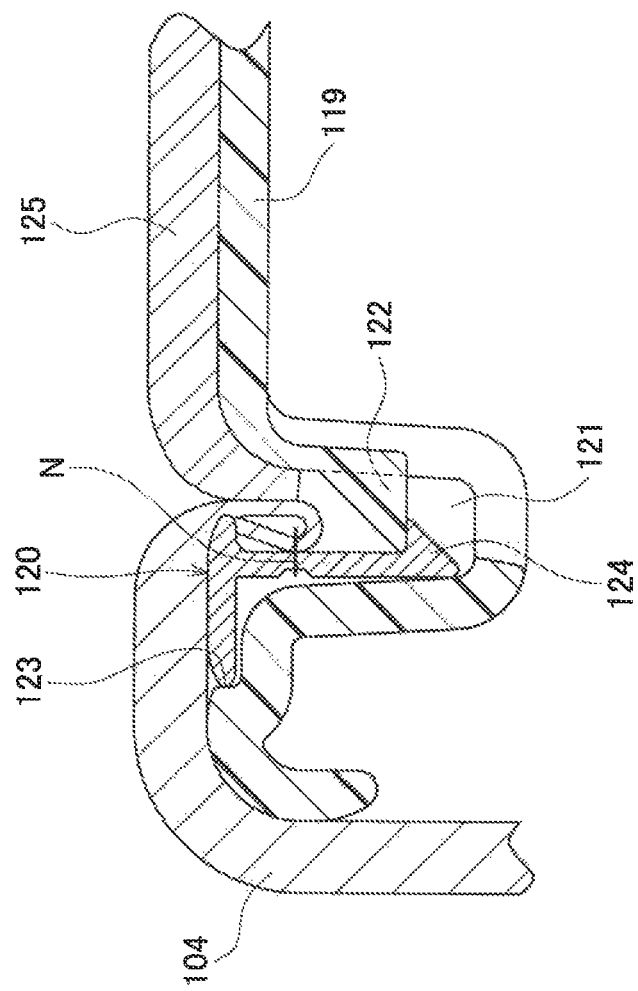
FIG. 10 is a cross-sectional view showing yet another example of a conventional surface skin-fastening structure.

FIG. 7 shows a state in which the end 38 of the surface skin 4b is laid out prior to the end 38 being curved around in the manner shown in FIG. 6B. In FIG. 7, the end 38 of the surface skin 4b extends in the direction that passes through the plane of the drawing. The position where the interlocking member 39 is joined to the second layer 37 of the surface skin 4b by sewing N is a position nearer to a distal end edge 37a of the second layer 37 of the surface skin 4b than to the center X0 of the interlocking member 39.

The first extension section 42a, which is the end edge 42 of the base member 27, extends outward in the present embodiment as previously described. The first extension section 42a serves to accommodate the surface skin 4b. Slits 43 are provided in the side wall of the base member 27 in locations at suitable intervals G from the surface of the first extension section 42a. The slits 43 are long narrow openings. The slits 43 extend along the direction in which the end 38 of the surface skin 4b extends (the direction that passes through the plane of FIG. 7). The width W in the direction perpendicular to the direction in which the slits 43 extend (the direction that passes through the plane of FIG. 7) is slightly greater than the thickness T, which is obtained by adding the thickness of the end 38 of the surface skin 4b and the thickness of the interlocking member 39. The end 38 and the interlocking member 39 can be curved around in the manner indicated by the arrow H and inserted into the slits 43. After being inserted, the interlocking member 39 can be brought into surface contact with the reverse surface of the side wall of the base member 27 via the distal end section of the end 38, as shown in FIG. 6B.

In FIG. 7, the end 38 of the surface skin 4b is first drawn out from the reverse surface side of the base member 27 (upper side of the base member 27 in FIG. 7) to the obverse surface side of the side wall of the base member 27 when the surface skin 4b is to be fastened to the base member 27, i.e., when the surface skin 4b is to be fastened to the seatback framework 9 of FIG. 2. Next, the end 38 is curved at the location of the first extension section 42a, which is the distal end of the base member 27, and reaches the surface of the side wall of the base member 27. The end 38 is subsequently curved in the location of the slits 43 and the distal end section to which the interlocking member 39 is joined is inserted into the slits 43. Furthermore, the distal end section of the surface skin 4b to which the interlocking member 39 is joined enters into the reverse surface side of the side wall of the base member 27, as shown in FIG. 6B, and the interlocking member 39 moreover makes surface contact with the reverse surface of the side wall of the base member 27 via the distal end section of the surface skin 4b. The end 38 of the surface skin 4b is thereby fastened to the base member 27, and consequently to the seatback framework 9.

In FIGS. 6B and 7, the surface skin-fastening structure is described in relation to one side wall of the base member 27, but the same surface skin-fastening structure is applied to the other side wall facing the one side wall of the base member 27 in FIG. 6A.

As described above, the fastening structure of the surface skin 4b of the present embodiment is a simple structure. The work for fastening the surface skin 4b carried out using the fastening structure of the surface skin 4b of the present embodiment is also very simple. Furthermore, the fastening structure of the surface skin 4b of the present embodiment has a simple structure and the cost is therefore low.

(Operation Lever Section Assembly)

First, in FIG. 2, the operation lever 25 is assembled to the surface skin-pressing member 28 when the operation lever section 16 of FIG. 2 is assembled to the seatback 3 as shown in FIG. 1. Specifically, as shown in FIG. 6A, the end section of the operation lever 25 is rotatably assembled to the side wall of the surface skin-pressing member 28 at the location of rotation support sections 44a,44b.

On the other hand, in FIG. 3, the pair of interlocking members 39 joined to the end 38 of the surface skin 4b is inserted into one of the openings of the slits 43 in the side wall of the base member 27, respectively, as indicated by the arrow H in FIG. 7, and is furthermore pressed out from the other opening of the slits 43 to the reverse surface of the side wall of the base member 27, as shown in FIG. 6B. Furthermore, the interlocking member 39 and the end 38 of the surface skin joined thereto stops in a state of surface contact with the reverse surface of the side wall of the base member 27, as shown in FIG. 6B. The surface skin 4b is thereby fastened to the sidewall of the base member 27 in FIG. 3.

In FIG. 2, the upper end 30a of the inner cable 30 of the wire cable 29 is thereafter linked to the lower end of the operation lever 25 assembled to the surface skin-pressing member 28. The assembly of the operation lever 25 and the surface skin-pressing member 28 is thereafter inserted into the opening K of the surface skin 4b as indicated by the arrow J of FIG. 3, the surface skin 4b is furthermore pressed to the extension sections (i.e., end edges) 42a, 42b by the frame member 26, which is the extension member of the surface skin-pressing member 28 (see FIG. 6B). Also, in FIG. 3, the surface skin 4b is presses to the second extension section 42c, which is the end edge of the base member 27, by a suspended portion 26a of the frame member 26. The surface skin 4b is thereby fastened by the surface skin-pressing member 28 to the base member 27, and consequently, the seatback framework 9. As a result, the operation lever section 16 is assembled in a predetermined position of the seatback 3, as shown in FIG. 1. Also, as shown in FIG. 5, the frame member 26 is disposed around the periphery of the operation lever 25 to function as an escutcheon.

As described above, in accordance with the present embodiment, the surface skin 4b is fastened in advance to the base member 27 by the interlocking member 39 being inserted into the slits 43 in FIG. 3, and therefore the work for pressing the surface skin 4b to the base member 27 with the aid of the surface skin-pressing member 28 is greatly facilitated. As a result, the work of fastening the surface skin 4b is facilitated.

The surface skin 4b is fastened to the base member 27 by the interlocking member 39 being inserted into the slits 43, and then the surface skin 4b is furthermore pressed to the base member 27 by the frame member 26 of the surface skin-pressing member 28. Therefore, the surface skin 4b can be securely fastened to the base member 27, and consequently to the seatback framework 9.

The surface skin-fastening structure of the present embodiment is formed in a simple manner by the interlocking member 39, the slits 43, and the surface skin-pressing member 28, and costs are therefore very low.

(Other Embodiments)

The present invention has been described using a preferred embodiment, but the present invention is not limited to the embodiment and may be variously modified within the spirit of the invention described in the claims.

For example, in the embodiment described above, the end edge 42 of the base member 27 is formed in the shape of the first extension sections 42a, 42b, but in lieu thereof, the extension section 42 may also be formed by the thickness portion of the side wall of the base member 27. In this case, the end edge 42 does not have an extension section.

In the embodiment described above, a shell-shaped seatback framework 9 was used, as shown in FIG. 2, but in lieu thereof, it is also possible to use a frame-like seatback framework formed by combining long narrow rod-like members or long narrow plate-like members together. In this case, the base member 27 shown in FIG. 2 is fastened to the rod-like members or plate-like members forming the framework.

In the embodiment described above, the case in which the surface skin-fastening structure and the operation lever section are provided to the seatback framework 9 of FIG. 2 was given as an example. However, a structure similar to the surface skin-fastening structure and a structure similar to the operation lever section may be used in the seat cushion framework 8.

In the embodiment described above, the base member 27, which is a separate member from the seatback framework 9 is fastened to the seatback framework 9 in FIG. 2. However, in lieu thereof, the base member 27 may be integrally formed with the seatback framework 9 by molding resin.

REFERENCE SIGNS LIST

1. Vehicle seat, 2. Seat cushion, 3. Seatback, 4a, 4b. Surface skins, 7. Framework structure, 8. Seat cushion framework, 9. Seatback framework, 10a, 10b. Side framework members, 11. Center framework member, 14. Main body section, 15. Peripheral wall section, 15a. Bend-around section, 16. Operation lever section, 17. Pad, 18. Hook member, 19a, 19b. Linking means, 21a, 21b. Brackets, 22a, 22b. Tilting movement mechanisms, 23a, 23b. Second brackets, 25. Operation lever, 26. Frame member, 26a. Suspended portion of the frame member, 27. Base member, 29, 29a, 29b. Wire cables, 30. Inner cable, 30a. Upper end of the inner cable, 30b1, 30b2. Lower ends of the inner cable, 31. Outer cable, 32. Divider, 35*a*, 35*b*. Pins, 36. First layer of the surface skin, 37. Second layer of the surface skin, 37*a*. Distal end edge of the surface skin, 38. End of the surface skin, 39. Interlocking member, 42. Extension section (end edge of the base member), 42*a*, 42*b*. First extension sections, 42*c*. Second extension section, 43. Slits, 44*a*, 44*b*. Rotation support sections, B. Tiltable movement, D-D'. Direction of lever operation, G. Intervals, H. Insertion direction of the distal end of the surface skin, K. Opening in the surface skin, N. Sewing, T. Thickness of the distal end of the surface skin, W. Width of the slits, X0. Center of the interlocking member

The invention claimed is:

1. A surface skin and a surface skin-fastening structure for a vehicle seat for fastening the surface skin to a framework of the vehicle seat, the surface skin and the surface skin-fastening structure comprising:
  a base member, which is integral with the framework;
  a surface skin-pressing member fitted into the base member;
  an interlocking member provided to an end of the surface skin; and
  slits provided to the base member, each slit including openings on opposite sides of the base member,
  wherein the base member includes opposite end edges that makes contact with a reverse surface of the surface skin,
  wherein the slits extend in linear fashion along the end edges of the base member,
  wherein, with the end edges of the base member being covered with the surface skin, the interlocking member and the end of the surface skin to which the interlocking member is provided, are inserted into one of the openings of the slits and pass through the slits to appear from another one of the openings, and are stopped in a state of surface contact at the base member in a vicinity of the other one of the openings, and
  wherein the surface skin-pressing member presses the surface skin against the end edges of the base member.

2. The surface skin and the surface skin-fastening structure for the vehicle seat according to claim 1, wherein the interlocking member is joined to the end of the surface skin by sewing, and
  wherein a sewing position is a position nearer to a distal end edge of the surface skin than to a center of the interlocking member.

3. The surface skin and the surface skin-fastening structure for the vehicle seat according to claim 2, wherein the end edges of the base member include extension sections that extend outward, and wherein the surface skin-pressing member presses the surface skin to the extension sections.

4. The surface skin and the surface skin-fastening structure for the vehicle seat according to claim 3, wherein the slits are provided to both sides of the base member so as to sandwich the surface skin-pressing member,
  wherein the extension section includes first extension sections that correspond to each of the slits, and a second extension section continuous with the first extension sections,
  wherein the first extension sections extend in a direction crosswise to a direction in which the surface skin-pressing member is fitted into the base member,
  wherein the second extension section extends in a direction substantially parallel to the direction in which the surface skin-pressing member is fitted into the base member, and
  wherein the surface skin-pressing member presses the surface skin to each of the first extension sections and the second extension section.

5. The surface skin and the surface skin-fastening structure for the vehicle seat according to claim 4, wherein the base member includes the framework or a member fastened to the framework.

6. The surface skin and the surface skin-fastening structure for the vehicle seat according to claim 4, wherein the base member includes a separate member from the framework of the vehicle seat and includes a member fastened to the framework, and wherein the framework is formed in a shell shape using a carbon fiber reinforced plastic.

7. An operation lever device for a vehicle seat, comprising: an operation lever provided to an opening opened in a surface skin;
  a frame member provided to a periphery of the operation lever on an outer side of the surface skin; and
  a surface skin-fastening structure for fastening the surface skin to a framework of the vehicle seat,
  wherein the surface skin-fastening structure includes the surface skin-fastening structure for the vehicle seat according to claim 1,
  and wherein the frame member includes a portion of the surface skin-pressing member and the frame member presses the surface skin to the end edges of the base member.

8. A vehicle seat comprising a seat cushion on which buttocks of a seated occupant rests, and a seatback for accommodating a back of the seated occupant, wherein the seatback comprises a seatback framework, a pad mounted on the seatback framework, a surface skin covering the pad, and a surface skin-fastening structure for fastening the surface skin to the seatback framework, and
  wherein the surface skin-fastening structure is the surface skin-fastening structure for the vehicle seat according to claim 1.

9. The vehicle seat according to claim 8, wherein the seatback framework is formed in a shell shape using a synthetic resin.

* * * * *